Figure 2:
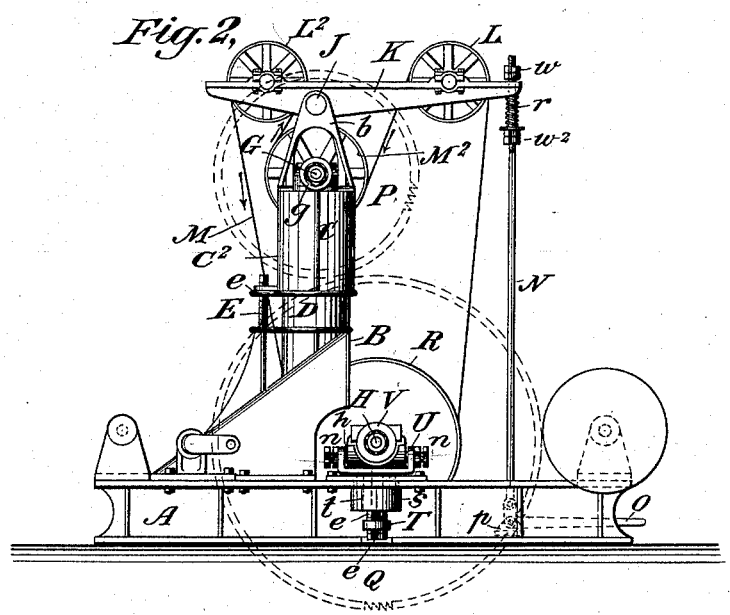

(No Model.)  2 Sheets—Sheet 2.

E. E. THOMAS.
CIRCULAR SAWING MACHINE.

No. 518,432. Patented Apr. 17, 1894.

Witnesses:—

Inventor:—
E. E. Thomas

UNITED STATES PATENT OFFICE.

EDWIN E. THOMAS, OF BAY CITY, MICHIGAN, ASSIGNOR TO MICHAEL GARLAND, OF SAME PLACE.

CIRCULAR SAWING MACHINE.

SPECIFICATION forming part of Letters Patent No. 518,432, dated April 17, 1894.

Application filed February 3, 1894. Serial No. 498,962. (No model.)

*To all whom it may concern:*

Be it known that I, EDWIN E. THOMAS, of Bay City, in the county of Bay and State of Michigan, have invented a new and useful Improved Circular Sawing Machine; and I do hereby declare that the following is a full, clear, and exact description of the same, reference being had to the accompanying drawings, forming part of this specification.

My invention relates, more particularly, to that type of circular saw mills in which two saws are mounted, one above the other, and in the same plane, and commonly designated as "double" circular mills; though as to some of the structural features of my improved machine, my invention may be applied to other forms of circular saw mills.

As heretofore constructed, so far as I know, double circular mills have had the top saw so hung, or so combined with the other portions of the machine, or mill, that, when only the lower (and usually larger) saw had to be used (the two saws, as is well understood being used only when the log is of too great diameter to be cut by the lower saw alone), the upper saw has remained in its normal position. The presence of the top saw-rig—*i. e.*, the frame and accompanying devices of, or attachments to, the top saw—when this saw is in a state of disuse, is objectionable, since it is obstructive of the vision of the sawyer, or operator, of the machine; and one part of my invention has for its object to cure this defect in double circular mills; and to this end and object one part of my invention consists in a top saw-rig, which is capable of a ready and easy adjustment, by which, when in a condition of disuse, the top saw with its mandrel and arbor-carrying frame, may be turned, or swung, around to one side of the main frame and lower saw, and out of the way; all as will be hereinafter fully explained, and as will be most particularly pointed out in the claims of this specification. And my invention further consists in certain novel structural features, by means of which I am enabled to properly drive the top saw, when in use, and throw off the power and motion when it may be desirable to adjust the top saw-rig, to a condition of disuse; also in certain novel structural features, or combinations of devices, by means of which either one, or both (where two are used) of the saw mandrels may be lined perfectly; all as will be hereinafter fully explained, and as will be most particularly pointed out in the claims of this specification.

To enable those skilled in the art to which my invention relates, to make and use machines, or mills, embracing the same, either in whole, or in part, in either the precise form in which I herein show and describe my improvements as carried into effect, or under some modification thereof, I will now proceed to more fully describe the several novel features of my improved machine, referring by letter to the accompanying drawings which form part of this specification.

Figure 3:
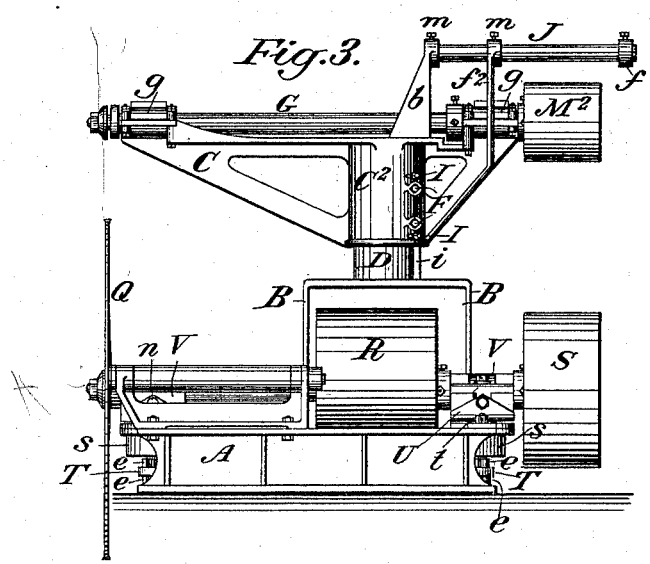

In the drawings, Figure 1 is a top view of a double circular sawing machine (with the log-carriage, &c., omitted) embodying all the parts, or structural features, of my invention. Fig. 2, is an elevation showing that side of the machine which faces the log-carriage, and drawn on a smaller scale. Fig. 3 is an end view, looking at the machine in the direction indicated by the arrow 2, at Fig. 1, and on the same scale as Fig. 2.

In the several figures, the same part will be found always designated by the same letter of reference.

I may remark here that in Fig. 1, I have omitted the angle lever (seen at Fig. 2) for working the vertical rod which, in turn, actuates the overhead pulley-frame of the top saw-rig; and at Fig. 3 have left out not only said lever, but also said rod and the tilting frame, with its two pulleys; for the sake of simplicity in the drawings.

In the drawings, A is the main frame, or husk, which, in the case shown, has mounted directly on it, (one at the rear, and the other at the forward, middle portion of the frame) the two yoke-like, adjustable, journal box stands, U, U; within the yoke of each of which is pivotally (and laterally adjustable) mounted, one of the journal boxes V, and in the said boxes runs the mandrel, or shaft H of the main lower saw Q; said shaft being provided with the usual fast pulley R on which the drive-belt (not shown) that drives the saw shaft, is banded. On the rear end of the said make it cut in the same plane with saw Q, or, in other words, so as to have the kerf cut conjointly by the two saws, lie in one and the same (perfect) plane.

It will be understood that when the binder screws I (of which there are preferably four, two on each side of the socket-like part $C^2$) are loosened, and the frame C with its socket-like part $C^2$ otherwise unrestrained, said frame is free to turn, round about the stem D, as an axis of rotation, to the extent of about one-quarter of a complete revolution, and in the direction indicated by the arrow 3 at Fig. 1, and I will now explain the object of having this frame capable of this sort of movement, and how it is effectuated.

When the top saw P may not be needed, as in the case of sawing up a log of small enough diameter to be cut up by the lower saw only, it is very desirable to have the top saw-rig, as it is called, i. e. the top saw and all its attachments, or appurtenances, moved out of its operative position, and thus entirely out of the way. In such event, by simply disconnecting the actuating rod N from the end of frame K, the latter may be allowed to oscillate on the shaft J until belt M is completely slacked, whereupon said belt may be unshipped entirely from drive pulley S, and the lower loop of the belt be hung up (out of the way) on the lower end of frame K. Then with the binder-screws I released, the socket $C^2$, with the frame portion C, and all the attachments of the latter (or all the parts carried by said frame), including the top saw, may be swung around to one side, and wholly out of the way. And this novel structural feature of my improved machine I consider a very important part of my invention, capable of being carried into effect under various modifications of the details of construction by which I am thus enabled to not only disconnect the top saw-rig from the means for imparting power and motion to said saw; but also readily shift the positions of all the parts (especially that of the saw and its mandrel), to get them all out of the way as explained.

By means of the universally adjustable journal boxes V, and their supporting stands, I am enabled to quickly and perfectly line up the mandrel H of the lower saw Q, and adjust the latter in perfect alignment with the line of travel of the log carriage, and in plane with the other saw; as I will now explain:—As the lugs T on the main frame, or husk, A are fixtures, and vertically sustain, or support the yoke-like stands in which are hung the journal-boxes V of the saw shaft H, and as the downwardly projecting stems t of the stands U (see Figs. 2 and 3) are arranged telescopically, in the hub-like devices s of the main frame, it follows that by turning, or adjusting, the nuts e, e, that are threaded on the screw stems of stands U, said stands will be raised, or lowered, and held in any desired position vertically, relatively to the fixed points of support at T; and thus may either end of the shaft H be either elevated, or depressed, as may be desired.

To permit a vertical adjustment of one end of shaft H without any cramping, or derangement, of the journal-bearings, each journal-box V is free to oscillate on the transverse axis formed by the pivotal connection of its trunnions h with the stand U, and by a proper manipulation of the nuts and jam nuts n (see Figs. 1 and 2) these trunnions, when set may be secured against casual movement. By means of said nuts the boxes may also be slightly adjusted (independently) laterally, in order to vary the line of the shaft's axis relatively to a given vertical plane, thus varying the plane of the saw Q accordingly. By the means last described, I am enabled, it will be seen, to easily, and, at the same time, perfectly adjust the saw mandrel H, in all necessary directions, to set the saw Q exactly right in every manner.

Having now so fully explained the novel structural features of my improved machine that those skilled in the art can readily practice my invention, either in whole or in part, in either the precise form of machine shown, or under some modification in form and wishing it to be understood that, in so far as there are features of improvement which are separable from the rest of my invention, said separable parts may be used separately and the advantages due thereto gained, what I claim as new, and desire to secure by Letters Patent, is—

1. In a double circular saw mill, or machine, the combination, with the husk, or frame, which carries the mandrel of the lower saw, of a top saw-frame supported by the said husk and adapted to oscillate laterally about an axis of motion and thus turn to one side and out of the way the top saw and its attachments; substantially as hereinbefore set forth.

2. In a double circular saw mill, the combination with the frame, or husk, which carries the lower saw mandrel, of a top saw frame support, mounted on said husk; and a top saw frame arranged to oscillate round about a vertical cylindrical stem, or column, of said support; all substantially as and for the purposes set forth.

3. In a double circular saw mill, the combination, with the two frames, carrying, respectively, the lower and upper saw mandrels, the top frame being capable of oscillation relatively to the lower frame, of means for adjusting the upper frame, both vertically and in the direction of its oscillatory path of motion; substantially as and for the purposes set forth.

4. In a double circular saw mill, the combination with the upper and lower saw mandrel frames; and a drive-pulley mounted fast on the lower saw mandrel, of a pulley fast on the upper saw mandrel; a tilting pulley frame, provided with two loose pulleys; and mounted on a fixed axis arranged over the upper saw mandrel, and intermediately of said loose pulleys, a belt banded over all of the aforesaid pulleys; and suitable means for adjusting, or setting, the said tilting frame, to either effectuate the driving of the upper saw mandrel, from the pulley of the lower one, or let the top saw mandrel remain undriven; substantially as set forth.

In witness whereof I have hereunto set my hand this 27th day of October, 1893.

EDWIN E. THOMAS.

In presence of—
A. M. GELSTON,
N. E. McKAY.

(No Model.)
J. R. WAIN.
SELF ACTING MULE AND TWINER.
No. 518,433. Patented Apr. 17, 1894.
FIG:1.
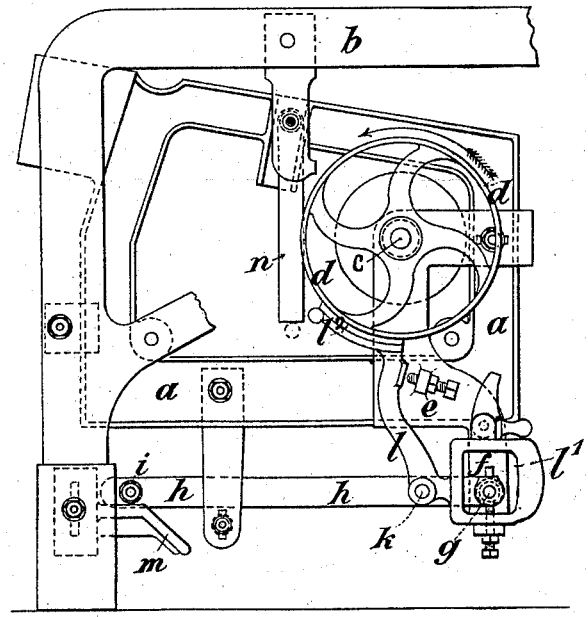
FIG:2.
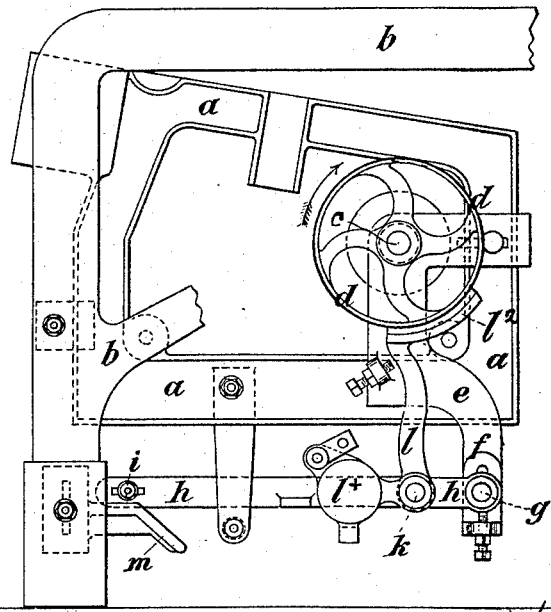
Witnesses.
Inventor.
James Robert Wain
by his attorneys
Howson and Howson